US007309668B2

(12) United States Patent
Wilson et al.

(10) Patent No.: US 7,309,668 B2
(45) Date of Patent: Dec. 18, 2007

(54) MULTIPLE LAYER DIRECTIONALLY ORIENTED NONWOVEN FIBER MATERIAL AND METHODS OF MANUFACTURING SAME

(75) Inventors: Paul G. Wilson, Waxahachie, TX (US); Darrell R. Heine, Red Oak, TX (US); John J. Andrews, Ennis, TX (US); Louis T. Hahn, Waxahachie, TX (US); Matti Kiik, Richardson, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 0 days.

(21) Appl. No.: 10/726,461

(22) Filed: Dec. 3, 2003

(65) Prior Publication Data

US 2005/0124250 A1    Jun. 9, 2005

(51) Int. Cl.
  *D04H 1/00*    (2006.01)
(52) U.S. Cl. .............. 442/327; 442/35; 442/149; 442/152; 442/164; 442/172; 442/366; 442/367; 442/368; 442/369; 442/381; 442/382; 442/383; 442/384; 442/385; 442/386; 442/387; 442/388; 442/389; 442/390; 442/391; 442/392; 428/41.3; 428/114; 162/131
(58) Field of Classification Search ........... 428/114, 428/41.3; 442/366–369, 381–392, 149, 152, 442/164, 172, 35, 327; 162/131
See application file for complete search history.

(56) References Cited

U.S. PATENT DOCUMENTS 3,617,437 A    11/1971  Bagg
4,250,221 A *  2/1981  Pfeffer .................. 442/367
4,258,098 A *  3/1981  Bondoc et al. .......... 162/156
4,278,720 A *  7/1981  Shannon ................ 428/109
RE31,601 E     6/1984  Ikeda et al.
4,539,254 A *  9/1985  O'Connor et al. ......... 442/32
4,668,325 A *  5/1987  Katz ..................... 156/322
4,762,744 A *  8/1988  Woiceshyn et al. ....... 428/219
5,039,465 A    8/1991  Freeman et al.
5,108,831 A    4/1992  Green
5,151,146 A    9/1992  Green (Continued)

OTHER PUBLICATIONS

Boyd, Jennifer A., International Searching Authority, Notification of Transmittal of The International Search Report, International Search Report, Written Opinion of the International Searching Authority, Sep. 15, 2004.

(Continued)

*Primary Examiner*—Andrew T. Piziali
*Assistant Examiner*—Peter Y Choi
(74) *Attorney, Agent, or Firm*—Baker & McKenzie LLP

(57) ABSTRACT

Disclosed herein are embodiments of a multi-layer nonwoven fiber material, and related methods of manufacturing the material. In one exemplary embodiment, the fiber material includes a first layer of directionally aligned fibers together with a second layer of randomly dispersed fibers dispersed over the first layer. Consistent with one exemplary method for manufacturing a nonwoven fiber material, the method includes dispersing a first plurality of fibers horizontally in one or more predetermined directions, as well as dispersing a second plurality of fibers horizontally in random directions. In such an embodiment, the second plurality of fibers is dispersed over the first plurality of fibers. Moreover, an exemplary embodiment of a roofing shingle employing a nonwoven fiber material as described herein is as disclosed.

23 Claims, 4 Drawing Sheets

U.S. PATENT DOCUMENTS

| | | | |
|---|---|---|---|
| 5,158,824 A | 10/1992 | Gill et al. | |
| 5,277,854 A | 1/1994 | Hunt | |
| 5,439,726 A * | 8/1995 | Woiceshyn | 428/109 |
| 5,462,642 A | 10/1995 | Kajander | |
| 5,626,954 A | 5/1997 | Andersen et al. | |
| 5,869,413 A | 2/1999 | Gallagher et al. | |
| 5,872,067 A * | 2/1999 | Meng et al. | 442/387 |
| 5,876,835 A | 3/1999 | Noble et al. | |
| 5,965,257 A | 10/1999 | Ahluwalia | |
| 5,965,638 A | 10/1999 | Heine | |
| 6,003,424 A * | 12/1999 | Cordova et al. | 89/36.02 |
| 6,025,285 A | 2/2000 | Vyakarnam et al. | |
| 6,146,705 A | 11/2000 | Heine | |
| 6,149,851 A | 11/2000 | Deckers et al. | |
| 6,193,847 B1 | 2/2001 | Trokhan | |
| 6,193,914 B1 | 2/2001 | Harrison | |
| 6,296,921 B1 | 10/2001 | Blackmore et al. | |
| 6,316,085 B1 | 11/2001 | Heine | |
| 6,341,462 B2 | 1/2002 | Kiik et al. | |
| 6,355,584 B1 * | 3/2002 | Corrons | 442/367 |
| 6,531,078 B2 | 3/2003 | Laine et al. | |
| 2002/0121720 A1 * | 9/2002 | Davies et al. | 264/103 |

OTHER PUBLICATIONS

Advanced Glassfiber Yarns LLC. (1999). Glassfiber Reference Guide, pp. 1-12.

* cited by examiner

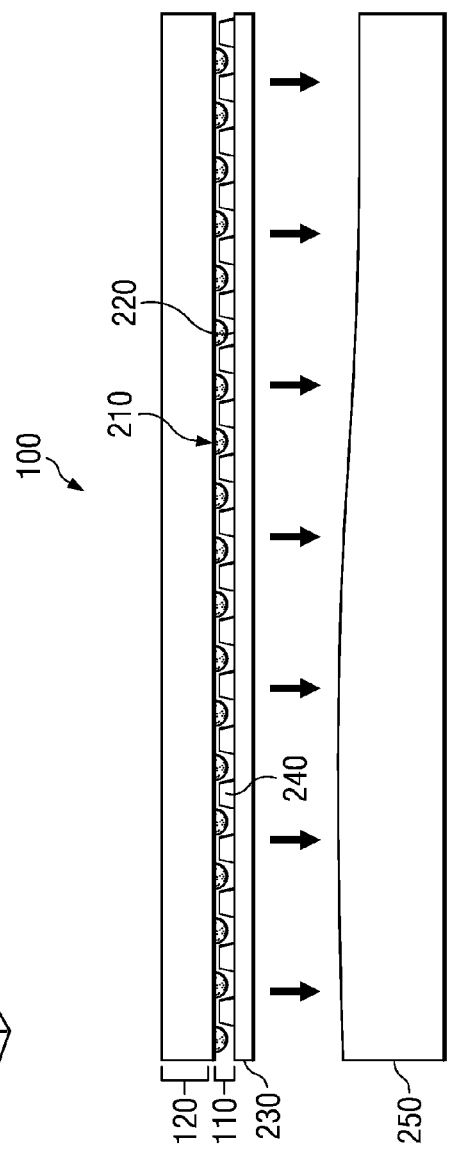
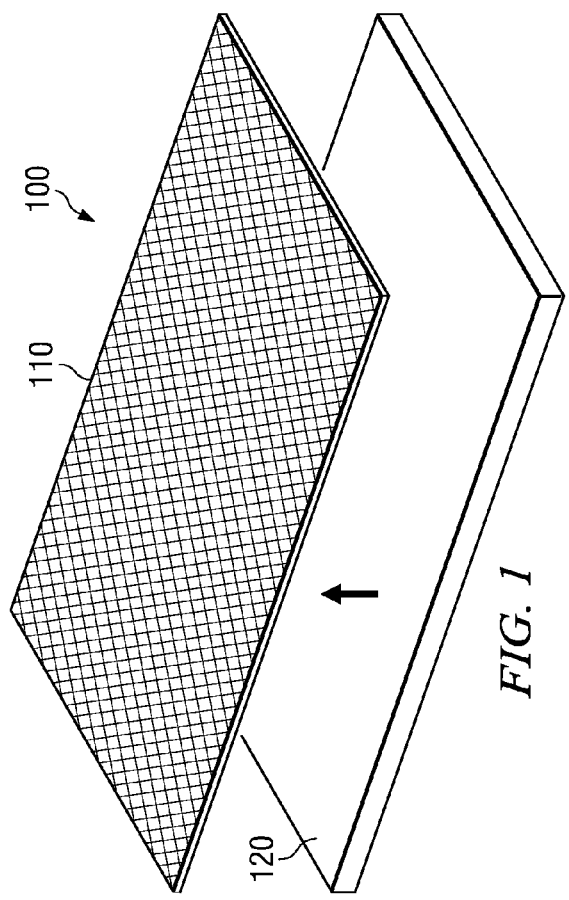

US 7,309,668 B2

MULTIPLE LAYER DIRECTIONALLY ORIENTED NONWOVEN FIBER MATERIAL AND METHODS OF MANUFACTURING SAME

TECHNICAL FIELD

Disclosed embodiments herein relate generally to nonwoven fiber materials, and more particularly to a multiple layer nonwoven fiber material and methods of manufacturing the same.

BACKGROUND

Nonwoven products have gained continued acceptance in the industry for a wide range of applications, particularly as replacements for woven fabrics. The term "nonwoven" refers to textile structures produced by bonding or interlocking fibers (or both) accomplished by mechanical, chemical, thermal or solvent means, or even combinations thereof. Such textile structures do not include paper or fabrics that are woven, knitted or tufted. Typically, nonwoven materials are composed of simply a single layer of randomly oriented fibers. Examples of products employing nonwoven materials to date include facings or top-sheets in diapers, incontinent pads, bed pads, sanitary napkins, hospital gowns, cleaning towels, carpets, draperies and industrial and commercial goods, such as wipe cloths, tire cords, conveyor belts, and hospital fabrics. It is typically desirable to produce the nonwoven material so that it has the flexibility and hand softness of a textile, yet is as strong as possible.

Conventional processes for manufacturing nonwoven materials, such as nonwoven glass fiber materials employed in roofing shingles, as well as other products, typically follow a similar approach. Specifically, a slurry of glass fibers is made by adding glass fiber strands to a pulper to disperse the fiber in the white water. The slurry mixture is then deposited onto a "forming wire" and dewatered to form a continuous wet nonwoven fibrous mat. To dewater the slurry, the water is drawn through the forming wire, leaving the fibers from the slurry randomly dispersed over the forming wire to form the mat. A binding agent may then be applied to the wet mat to bond the randomly dispersed fibers in their respective locations and directions. The mat material is then cut to a desirable size and dried. Alternative forming methods include the use of well-known "wet cylinder" forming, and "dry laying" using carding or random fiber distribution.

Although conventional nonwoven materials are typically stronger and resist tears more than woven materials, the density and/or number of fibers (i.e., the "weight" of the material) used to form the material often must be further increased to satisfy some intended uses. More specifically, while a nonwoven mat may be stronger than a similar woven mat, the nonwoven mat's weight may need to be increased to accommodate even further stresses. Unfortunately, as the weight of nonwoven materials is increased to accommodate higher stresses, the cost of manufacturing also increases.

It is thus highly desirable to provide for a nonwoven material that can be manufactured with less weight than conventionally available mats, but with equivalent strengths. To do so would allow for advantageous decreases in the cost of manufacturing an adequately strong nonwoven material.

BRIEF SUMMARY

Disclosed herein are embodiments of a multi-layer nonwoven fiber material, and related methods of manufacturing the material. In one exemplary embodiment, the fiber material includes a first layer of directionally aligned fibers together with a second layer of randomly dispersed fibers dispersed above the first layer. In another exemplary embodiment, the fiber material includes a first plurality of fibers horizontally dispersed in one or more predetermined directions. In addition, the fiber material includes a second plurality of fibers horizontally dispersed over the first plurality of fibers in random directions. In this embodiment, the fiber material still further includes binding material binding the first and second pluralities of fibers in their respective directions.

Methods for manufacturing a fiber material are also disclosed. For example, a disclosed method includes dispersing a first plurality of fibers horizontally in one or more predetermined directions, as well as dispersing a second plurality of fibers horizontally in random directions. In this method, the second plurality of fibers is dispersed over the first plurality of fibers.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which:

FIG. 1 illustrates an isometric view of one exemplary embodiment of a two-layer nonwoven fiber material;

FIG. 2 illustrates is a side sectional view of the two-layer nonwoven fiber material illustrated in FIG. 1;

DETAILED DESCRIPTION OF PREFERRED EMBODIMENTS

Figure 3:
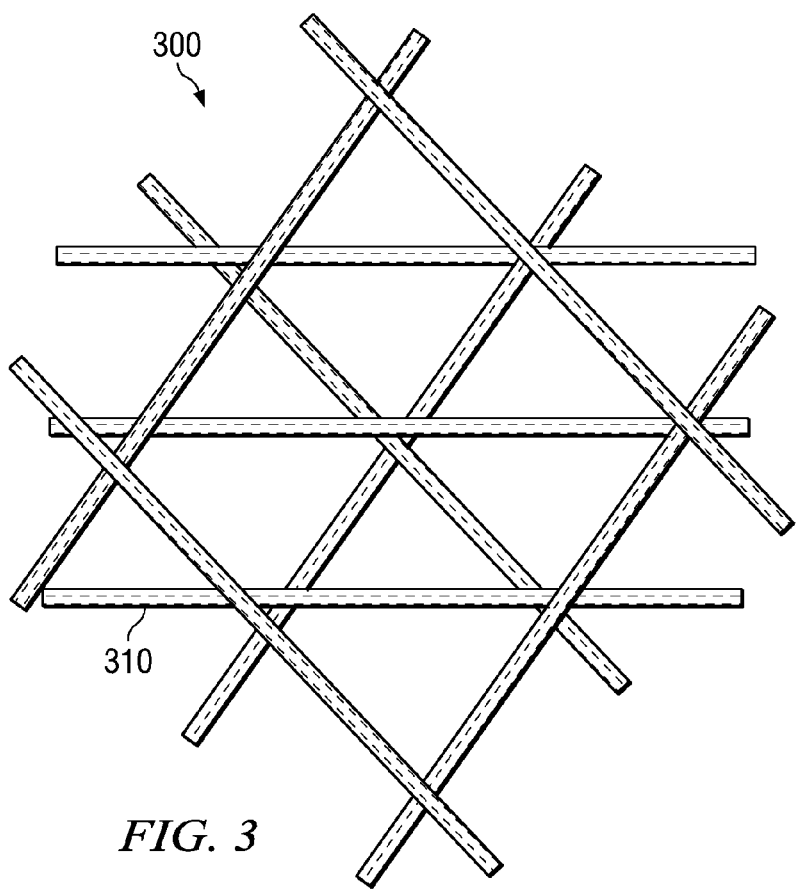
FIG. 3 illustrates a close-up view of an exemplary embodiment of a first layer of randomly distributed fibers of a nonwoven material formed over directionally aligned fibers.

Referring initially to FIG. 1, illustrated is an isometric view of one exemplary embodiment of a two-layer nonwoven fiber material or mat 100. The mat 100 includes a first layer 110 and second layer 120 composed of nonwoven glass fibers. Although glass fibers have been used in the illustrated embodiment, other embodiments of the mat 100 may be formed from other types of fibers. Typically, the type of fibers employed varies depending on the desired application of the mat 100. In other exemplary embodiments, synthetic polymer fibers (e.g., polyester fibers or polyester-glass blend fibers), ceramic and inorganic fibers, natural fibers, cellulosic fibers, and mixtures of any or all thereof may be employed to form the mat 100. It should also be noted that although the first and second layers 110, 120 are shown as two separate layers of the mat 100, the second layer 120 is actually typically formed over the first layer 110, typically in situ.

As illustrated, the mat 100 includes a first layer 110 of nonwoven fibers. Specifically, the first layer 110 is formed from a plurality of directionally aligned fibers. In the illustrated embodiment, the first layer 110 of the mat 100 includes fibers that are directionally aligned in a plurality of linear formations. More specifically, in this embodiment, the linear formations are actually a plurality of crossing linear formations, crossing in two distinct directions. While the two directions are perpendicular to one another, in the exemplary embodiment, numerous other arrangements may also be employed. In addition, the number of linear formations used to form the first layer 110, as well as their respective directions, is not limited to only two directions, as discussed in greater detail below.

The mat 100 of FIG. 1 also includes a second layer 120 comprised of randomly dispersed fibers, i.e., a plurality of fibers arranged in any of a number of random directions. As such, the randomly dispersed fibers lay among and upon one another in the manner typically found in conventional nonwoven fiber materials. The second layer 120 of fibers is formed over the first layer 110 of directionally aligned fibers, and is preferably formed to a substantially uniform thickness across the entire layer. Such uniformity provides for uniform strength characteristics across the entire second layer 120.

As with the second layer 120, the fibers in the first layer 110 may be deposited such that the first layer 110 also has a substantially uniform thickness thereacross. Such an embodiment typically provides substantially uniform strength characteristics across the entire first layer 110. Moreover, when both the first and second layers 110, 120 have a substantially uniform thickness, the entire mat 100 benefits from substantially uniform strength characteristics across its entirety.

Looking now at FIG. 2, illustrated is a side sectional view of the two-layer nonwoven fiber material 100 illustrated in FIG. 1. As illustrated, the second layer 120 of fibers is formed over the first layer 110 of fibers, and both have been formed to a substantially uniform thickness. For clarity of discussion, it should be appreciated that this sectional view of the mat 100 only illustrates one set of linear formations 210 within the first layer 110, rather than showing both sets of linear formations.

By only illustrating one set of linear formations 210, FIG. 2 more clearly illustrates the directional alignment of the fibers comprising the linear formations 210. More specifically, FIG. 2 shows the linear formations 210 as viewed from one end of the formations 210. Only ends of the fibers (one of which is designated 220) forming the first layer 110 are therefore visible from this view, since the fibers 210 are directionally aligned in the same direction as the linear formations 210. As a result, the linear formations 210 are formed in long, narrow strands of multiple directionally aligned and horizontally dispersed fibers 220 extending across the mat 100.

Also illustrated in FIG. 2 is an exemplary forming wire 230. As mentioned above, the forming wire 230 is employed to form the mat 100. The exemplary forming wire 230 is specifically designed for formation of the mat 100. Specifically, conventional forming wires typically comprise a simple and substantially flat screen on which the fibers in a slurry come to reset in a random orientation as the water 250 is drawn or otherwise removed from the slurry through the forming wire. In contrast, the forming wire 230 provided herein includes a similar flat portion, but also includes raised forming protuberances (an exemplary one of which is labeled 240) extending from the flat portion of the forming wire 230.

In this exemplary embodiment, the forming protuberances 240 form grooves or channels in the forming wire 230 having a depth of about 0.063 inches. In the same embodiment, the forming protuberances 240 may be arranged to form grooves therebetween having a width of about 0.1165 inches. By employing forming protuberances 240 on the forming wire 230, as the water 250 is removed from the slurry and the fibers come to rest on the forming wire 230, initial ones of the fibers are aligned by and between the forming protuberances 240. Once these fibers are aligned, they come to rest on the flat portion of the forming wire 230 in between the forming protuberances 240, thus forming the linear formations 210 of directionally aligned fibers of the first layer 110.

After the spaces in between the forming protuberances 240 are filled with fibers directionally aligned to lay therebetween, the thickness of the linear formations 210 substantially equals the height of the forming protuberances 240. At this point in the manufacturing process, the remaining fibers in the slurry can no longer be aligned between the forming protuberances 240 as the water 250 continues to be removed through the forming wire 230. Thus, the remaining fibers begin to horizontally disperse randomly over both the tops of the forming protuberances 240, as well as over the linear formations 210. This random dispersion of fibers results in the second layer 120 having the randomly oriented fibers discussed above formed over the first layer 110.

In a specific exemplary embodiment, the overall thickness of the mat 100 is about 0.035 inches, and the first layer 110 comprises a thickness of only about 0.002 inches to about 0.010 inches, as measured from the second layer 120, of the total thickness of the mat 100. Of course, a nonwoven material constructed according to the principles disclosed herein is not limited to any particular thickness for the first layer 110, nor any particular overall thickness for the material itself. In fact, in some embodiments, the thickness of the first layer 110 is about 50% of the overall thickness of the mat 100. Moreover, one factor that may be used in selecting the thickness of the first layer 110 is the desired overall weight of the material of a desired thickness. Specifically, since the first layer 110 is composed of only linear formations with spaces therebetween defined by the protuberances 240, the overall weight of the first layer 110 would be less than an equally thick conventional layer formed with randomly dispersed, but similarly sized, fibers. Although having less weight, the directionally aligned fibers in the first layer 110 will typically provide greater strength characteristics than a material formed with random fibers having the same thickness. Examples of such differences in strength are explored in further detail below.

Once the two layers 110, 120 of fibers have been formed using the forming screen 230 and the disclosed process, an aqueous binding material may then be applied to the nonwoven material. In such embodiments, the binding material is distributed among the fibers within the first and second layers 110, 120 in order to bond the individual fibers in their respective locations. For example, the binding material employed may be comprised of an organic compound, such as, but not limited to, acrylic latex, urea-formaldehyde, SBR latex, acrylic emulsions, and mixtures thereof. Of course, other appropriate types of binding agents may also be used to hold the fibers in position after the material is formed.

The nonwoven material may next be dried to remove any remaining water and to cure (e.g., polymerize) the binding material when such material is used. The drying may be accomplished using high-powered heat machines configured to direct heated air across the nonwoven material, but other techniques are also within the broad scope of the present disclosure. For example, in a drying and curing oven, the nonwoven material may be subjected to temperatures of 250-500° F., for periods usually not exceeding 4 to 5 minutes, to produce a cured, flexible, nonwoven fiber material.

Finally, the nonwoven material may be cut to a desired size. Preferably, a precision cut is performed on the finished nonwoven material to provide a finished width for the nonwoven fiber material. Such a precision cut allows the nonwoven material to be precisely trimmed to a desirable size (width), depending on the intended use of the material, without excessive waste of material. Moreover, the nonwoven material may be cut into a plurality of mats having a specific length, as well as width. For example, if the nonwoven material is to be used in roofing shingles, the material may be cut to the desired length at this point in the process. Alternatively, the entire length of nonwoven material may simply be rolled into a large roll for shipment, and then cut to the desired length(s) once received at another location.

Turning now to FIG. 3, illustrated is a close-up view of an exemplary embodiment of directionally aligned fibers of a nonwoven material 300. More specifically, the close-up view of FIG. 3 shows a plurality of intersections between three sets of linear formations 310. In such an embodiment of a nonwoven fiber material 300, the linear formations 310 may be formed so as to intersect at any of a variety of angles.

The alignment of each set of linear formations 310 with respect to one another, and thus the angles of intersection between the sets, may be selected through the pattern present on the forming wire used to form the nonwoven material 300. However, in addition to the orientation of the sets of linear formations 310, other factors to be considered in determining the final strength of such material 300 include width and height of each of the linear formations 310. Specifically, the amount or number of fibers included in each of the linear formations 310 may be adjusted depending on the desired strength, size, and overall weight of the final nonwoven material 300.

In this specific exemplary embodiment, three sets of exemplary linear formations 310 are illustrated, with each set aligned in a specific corresponding direction. In a specific example, the fibers that are horizontally aligned to create the linear formations 310 are fibers having a diameter ranging from about 0.00001 inches to about 0.00100 inches, and in a more specific embodiment, they are glass fibers ranging from about 0.0004 inches to about 0.0007 inches. In other embodiments, even wood fibers having a diameter as large as about 0.0300 inches may also be employed, and a nonwoven material constructed according to the principles disclosed herein is not limited to any particular fiber, or diameter of fiber. In addition, each of the fibers comprising the linear formations 310 may have a chopped length ranging from about 0.10 inches to about 1.5 inches; in this example, the fibers have a length of about 1 inch. Moreover, as with the mat 100 in FIG. 2, the material 300 may be formed to a final thickness, including both the first and second layers, of about 0.035 inches, with the linear formations 310 (i.e., the first layer) having a thickness of about 0.002 to 0.010 inches. Furthermore, the exemplary material 300 also includes binding material to bond the fibers in position, where the binding material comprises about 5%-30% of a total weight of the fiber material.

Manufacturing such an exemplary nonwoven material 300 results in a material having a tear-strength under the Elmendorf Tear Test greater than a single layer fiber material having a substantially equal total thickness and weight, and comprising only randomly dispersed similar fibers. More specifically, Table 1 sets forth a comparison of test results (using standard industry tests) between a conventional nonwoven fiber material, which is comprised of a single layer of randomly dispersed fibers, and a nonwoven fiber material constructed using the principles disclosed herein. For both materials, 15% of the weight of the material is binder material (Borden 413F® in this experiment), and the overall weight of each of the materials is 1.6 lb/square. In addition, in Table 1 "σ Tears" means the standard deviation in tear strength for n samples, and "σ Tensile" means the standard deviation in tensile strength for n samples. Also, the "Mean Tear" and "Mean Tensile" measurements are an average taken over a number of samples tested, n.

TABLE 1

| 1.6 lb/square mat 15% binder (Borden 413F) | Mean Tear, g | % Change | σ Tear, g | n | Tensile, lb/3" | % Change | σ Tensile, lb/3" | n |
|---|---|---|---|---|---|---|---|---|
| Conventional Single Layer Nonwoven | 326 | — | 119 | 24 | 111 | — | 10 | 12 |
| Novel Two-Layer Directional Nonwoven | 393 | ↑21% | 123 | 24 | 94 | ↓15% | 19 | 12 |

As is visible from the experimental results set forth in Table 1, the nonwoven fiber material 300 disclosed herein clearly has increased tear strength at a slight expense of tensile strength relative to the same mass (e.g., amount of fibers) of a conventional nonwoven material. Moreover, since the disclosed nonwoven material typically has stronger characteristics over conventional nonwoven materials, a material having a lower fiber weight than such conventional materials may be constructed according to the processes disclosed herein. In such embodiments, the weight of the novel material may be significantly less than that of comparable conventional materials, yet selected so that the novel material retains the same tear and tensile characteristics found in the conventional material.

Since a primary portion of the costs associated with manufacturing nonwoven materials is the amount of fibers used, the principles disclosed herein may be employed to secure significant savings in manufacturing costs by providing a comparably strong nonwoven material having significantly less weight or mass than conventional materials. The manufacturing savings would be especially substantial to manufacturers producing volumes of nonwoven materials. The principles disclosed herein may also be employed with respect to weaker fibers (and consequently less expensive) to provide for nonwoven materials having substantially similar strength characteristics relative to conventional nonwoven materials of the same weight, but using stronger fibers.

Figure 4:
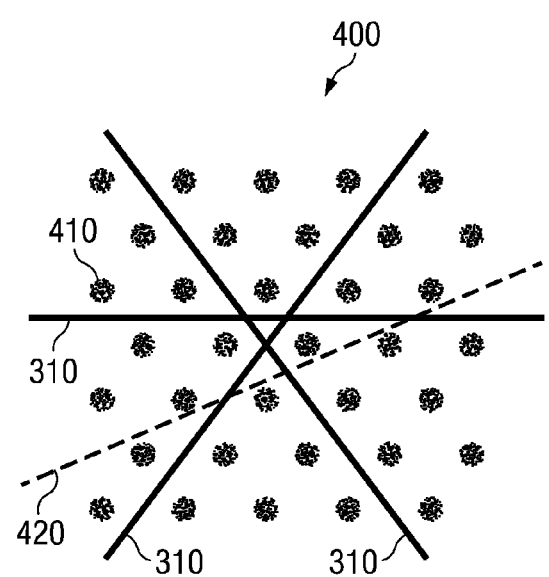
FIG. 4 illustrates a top view of an exemplary pattern of the protuberances on a forming wire used to produce the directionally aligned fibers illustrated in FIG. 3.

Turning now to FIG. 4, illustrated is a top view of an exemplary pattern 400 of the protuberances on a forming wire used to produce the directionally aligned fibers 310 illustrated in FIG. 3. As illustrated, the protuberances (one of which is labeled 410) may be substantially round when viewed from the top, but the principles for manufacturing the novel nonwoven material are not limited to any particular shape for the protuberances. As may be seen in FIG. 4, the specific arrangement of the protuberances 410, as well as the spacing selected therebetween, may be selected so as to provide three exemplary major linear formations 310 of horizontal, directionally aligned fibers. In addition, the pattern 400 provides the opportunity for minor linear formations 420 (e.g., having less fibers, and thus smaller, than major linear formation 310) aligned in other directions.

Providing multiple linear formations in crossing directions increases the strength characteristics of a nonwoven material manufactured using the disclosed methods, since tears (or other stresses) experienced across the material will typically have to cross at least one of the linear formations. Since multiple fibers are directionally aligned to form the linear formations 310, tearing across the linear formations 310 is substantially resisted. More specifically, in a nonwoven material made from only randomly dispersed fibers, tears or other stresses across the material will put stress directly across some fibers, while much of the stress will be applied between fibers that extend in the same direction as the tear. Stress applied in such directions simply works against the binding material and separates the adjacent fibers. In contrast, tears and other stresses applied across the linear formations 310 provided herein have to work to break the aligned strands of fibers forming the linear formation 310, as well as the binding material. A variety of forming wires may be constructed and utilized to form nonwoven materials constructed with the principles disclosed herein. The FIGS. 5-7 each provides exemplary embodiments of protuberance patterns that may be employed in a forming wire.

Figure 5:
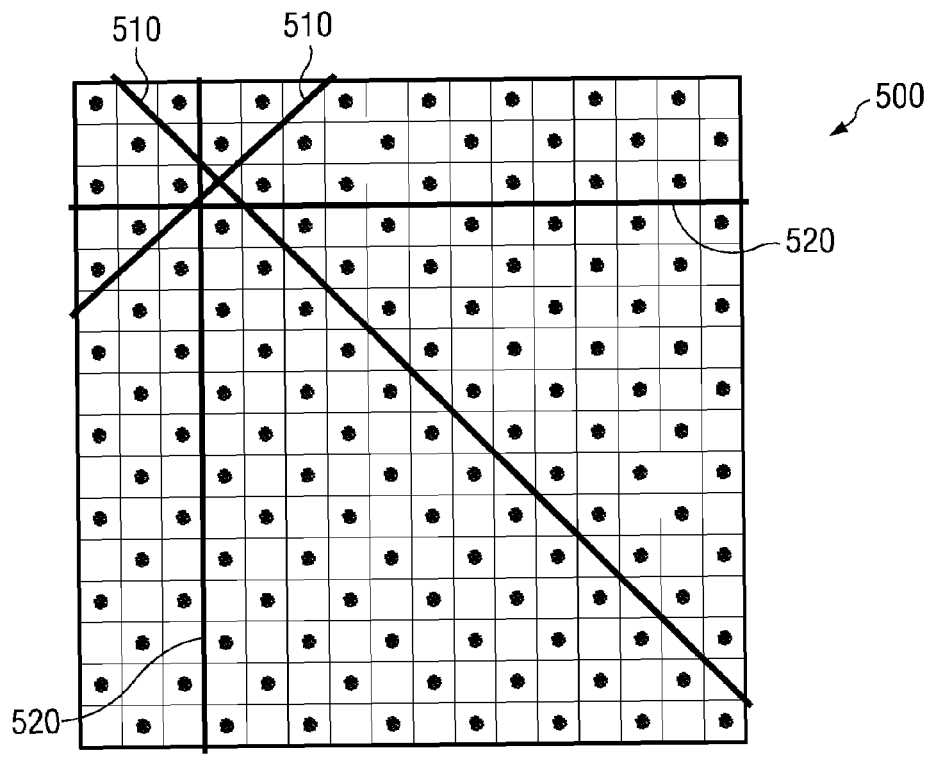
FIG. 5 illustrates a top view of another exemplary embodiment of a pattern of protuberances on a forming wire.

Turning next to FIG. 5, illustrated is a top view of another exemplary embodiment of a pattern 500 of protuberances on a forming wire. The arrangement of the pattern 500 in FIG. 5 is similar to that of the pattern 400 illustrated in FIG. 4 in that both have arrangements of protuberances that follow a Cartesian coordinate layout. However, the spacing of the protuberances in the pattern 500 differs such that only two major linear formations 510 are formed, each on a diagonal, and two minor linear formations 520 are formed, each offset 45° from the major linear formations 510. In such an embodiment, the two major linear formations 510 are perpendicularly oriented with respect to one another, while the two minor linear formations 520 are as well.

Moreover, the orientation of the linear formations 510, 520 with respect to the edges of the finished nonwoven material may be selected with the expected path(s) of potential tears in mind. This may be accomplished by selecting the arrangement of the protuberances on the forming wire based on the desired orientation of the linear formations 510, 520. As such, the pattern 500 may be created so that the directions of expected tears are perpendicular to one or more of the major linear formations 510, 520, thus further increasing resistance to tears and other stresses.

Figure 6:
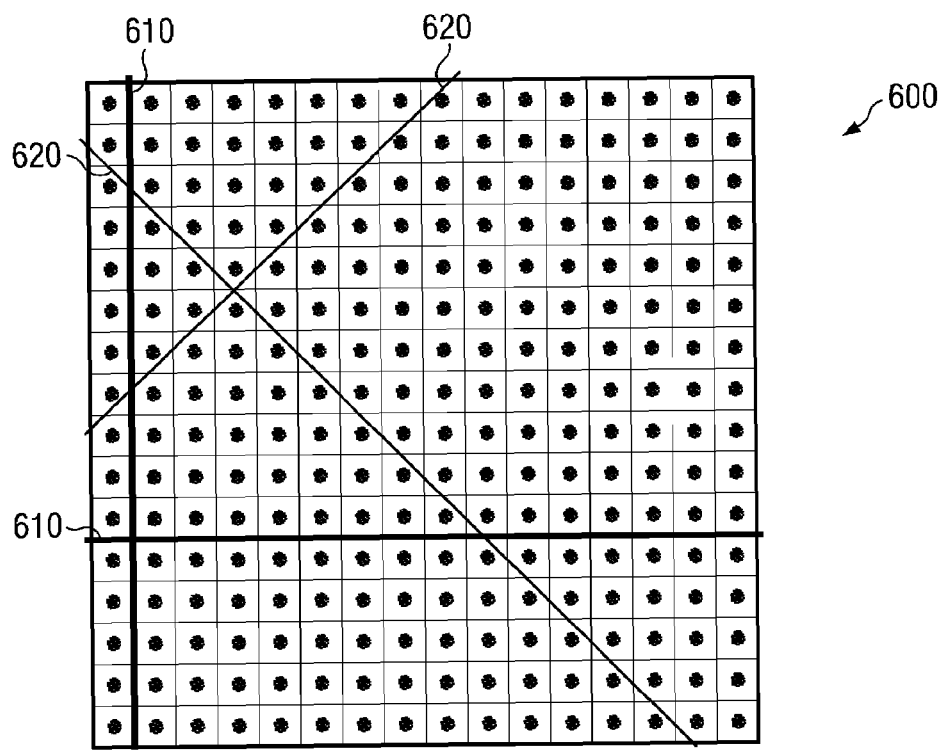
FIG. 6 illustrates a top view of yet another exemplary embodiment of a pattern of protuberances on a forming wire.

Looking now at FIG. 6, illustrated is a top view of yet another exemplary embodiment of a pattern 600 of protuberances on a forming wire. The particular arrangement of protuberances for this pattern 600 is also arranged in a Cartesian coordinate layout. However, twice the number of protuberances are employed, as compared to the pattern 500 in FIG. 5. As a result of this arrangement, only two major linear formations 610 are formed, this time each on a perpendicular to the material edges, while two minor linear formations 620 are formed, each on a diagonal and offset 45° from the major linear formations 610. As with the pattern 500 in FIG. 5, in this embodiment, the two major linear formations 610 are perpendicularly oriented with respect to one another, while the two minor linear formations 620 are as well.

Moreover, because more protuberances are employed in the illustrated pattern, the spacing of the grooves defining the widths of the linear formations 610, 620 may be smaller than found in other patterns. Of course, in some embodiments, while more protuberances may be used, the pattern may provide for a greater spacing therebetween. Thus, in all embodiments of a forming wire designed for use under the principles disclosed herein, the arrangement of the protuberances may be selected for a desired directional layout of linear formations 610, 620, while the spacing between protuberances (and their height) may be selected to change the dimensions of the linear formations 610, 620 themselves.

Figure 7:
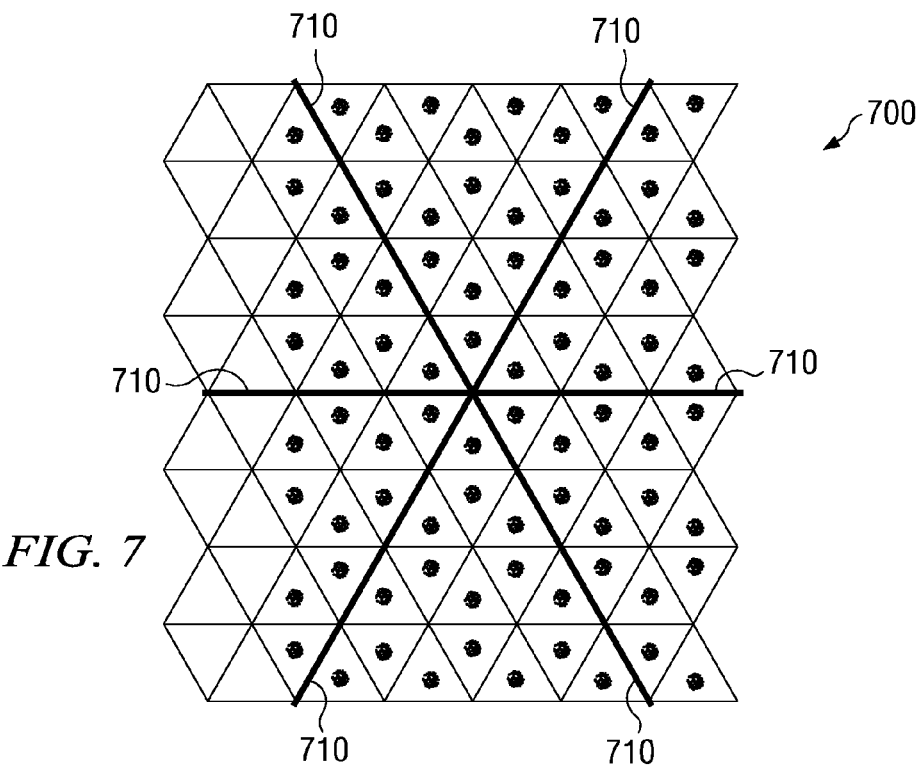
FIG. 7 illustrates a top view of still another exemplary embodiment of a pattern of protuberances on a forming wire.

Turning to FIG. 7, illustrated is a top view of still another exemplary embodiment of a pattern 700 of protuberances on a forming wire in accordance with the principles disclosed herein. Rather than arranging the plurality of protuberances in a Cartesian coordinate layout, as with the forming wires in FIGS. 4-6, the pattern 700 illustrated in FIG. 7 is arranged using a triangular coordinate layout. As a result of this type of arrangement, three major linear formations 710 of fibers may be created in the nonwoven material. Moreover, in this embodiment, the linear formations 710 intersect substantially equally at 60° from each other, providing a uniform layout of linear formations 710. While not shown, the spacing of the protuberances may also be selected to allow the formation of one or more minor linear formations as well. Of course, it should be noted that forming wires designed for use in the manufacturing processes disclosed herein are not limited to Cartesian or triangular coordinate layouts, and any arrangement of protuberances may be employed depending on the desired results of the first layer of fibers on the nonwoven material produced.

Figure 8:
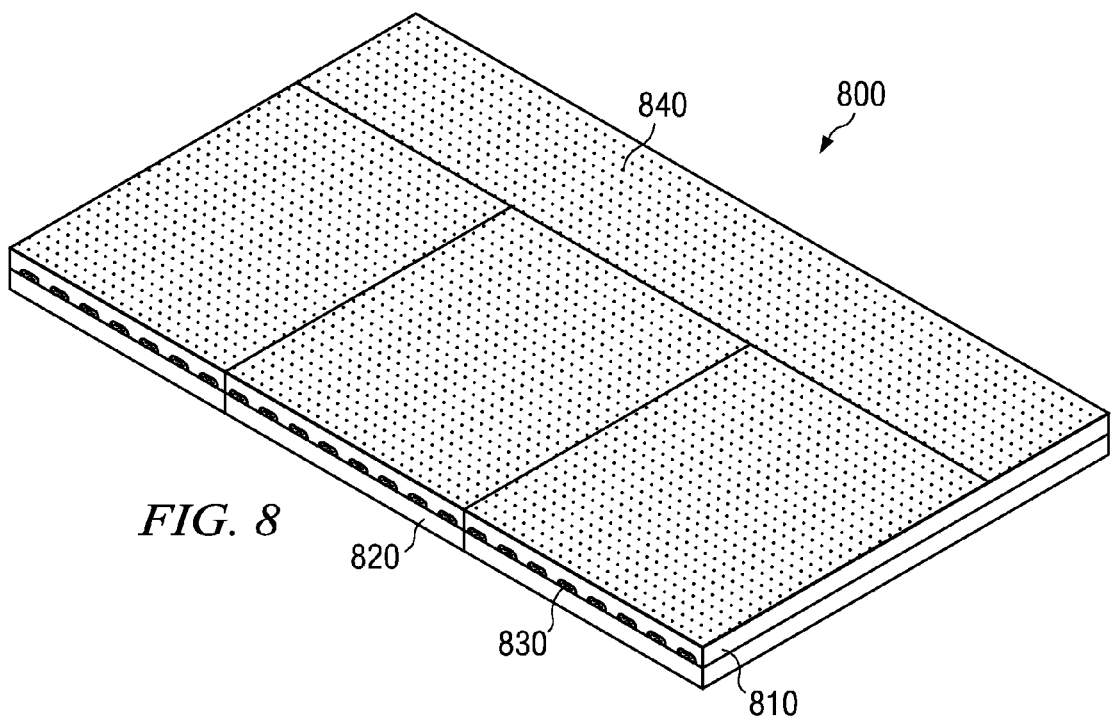
FIG. 8 illustrates an exemplary embodiment of a roofing shingle manufactured using a nonwoven material as disclosed herein.

Turning finally to FIG. 8, illustrated is an exemplary embodiment of a roofing shingle 800 manufactured using a nonwoven material as disclosed herein. The roofing shingle 800 may be manufactured by laminating a bituminous material, for example, an asphalt-based layer, to form a bituminous layer 810 (which may contain other materials as well) over a nonwoven roofing mat 820 made from the nonwoven material as described above. As illustrated, the nonwoven roofing mat 820 includes first and second layers of fibers. Specifically, the first layer is composed of directionally aligned fibers arranged in linear formations 830, while the second layer is formed over the first layer as is comprised of randomly dispersed fibers.

After being coated with the bituminous layer 810, granules 840 may be applied to the top of the roofing shingle 800.

The granules 840 are pressed into the bituminous layer 810 in any suitable manner, such as the use of granule press. The roofing shingle 800, which is originally manufactured in one continuous sheet, is cut from the continuous sheet by a cutting cylinder or similar device. After individual shingles 800 are cut, each may be processed with commonly used machinery for handling roofing shingles, such as a shingle stacker to form stacks of shingles to be bundled for shipping. In alternative embodiments, the nonwoven material used to form the fiber mat 810 may be used to form roofing membranes, or other roofing materials, rather than roofing shingles, and the disclosure herein should not be understood to be limited to any particular product.

In the exemplary embodiment of a roofing shingle, experiments of the tear strengths of roofing shingles employing both conventional nonwovens and the nonwoven fiber material disclosed herein were also conducted. Table 2 sets forth the results of such a comparison, again performed with multiple samples (n) using the Elmendorf Tear Test.

TABLE 2

| 1.6 lb/ square mat 15% binder (Borden 413F) | Tear, g | Min, g | Max, g | σ Tear, g | n | COV, % |
|---|---|---|---|---|---|---|
| Conventional Single Layer Nonwoven | 1,089 | 816 | 1,507 | 207 | 10 | 19.0 |
| Novel Two-Layer Directional Nonwoven | 1,480 | 1,248 | 1,708 | 153 | 10 | 10.3 |
| Percent Difference from Control | ↑36% | ↑53% | ↑13% | | | ↓46% |

As is visible from the experimental results set forth in Table 2, roofing shingles manufactured with the disclosed nonwoven fiber material have better tear resistance over comparable conventional roofing shingles of the same weight. The percent coefficient of variation in tear results [(standard deviation)/mean] demonstrates better uniformity in tear performance for the novel shingle product over comparable conventional shingle products. This is desirable for better process control as well. Moreover, since the disclosed nonwoven material typically has stronger characteristics over comparable conventional nonwoven materials, a roofing shingle having a significantly lower nonwoven fiber weight than roofing shingles made from conventional nonwoven fiber materials, yet having the same tear and tensile factors found in the conventional shingle, may be constructed as disclosed herein.

While various embodiments of a multi-layer nonwoven fiber material, and related methods for manufacturing the material, according to the principles disclosed herein have been described above, it should be understood that they have been presented by way of example only, and not limitation. The breadth and scope of the invention(s) should thus not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Multiple inventions are set forth according to the limitations of the multiple claims associated with this disclosure, and the claims accordingly define the invention(s), and their equivalents, that are protected thereby. In all instances, the scope of the claims should not be constrained by the headings set forth herein.

What is claimed is:

1. A nonwoven fiber article, comprising:
a first surface comprising a pattern formed of chopped nonwoven fibers directionally aligned in at least three directions in a plurality of corresponding linear formations on the same linear plane, and thus the linear formations having substantially the same thickness as the thickness of the linear plane, the fibers dewatered from a slurry such that fibers within linear formations in one direction are laid randomly interlaced with fibers within linear formations in other directions at intersections of the linear formations; and
a second surface opposed to and coextensive with the first surface, the second surface comprising a collection of chopped nonwoven fibers dewatered from the slurry such that they are laid randomly dispersed throughout the second surface.

2. A fiber article according to claim 1, wherein the fibers are selected from the group consisting of: glass fibers, synthetic polymer fibers, ceramic and inorganic fibers, natural fibers, cellulosic fibers, and mixtures of any or all thereof.

3. A fiber article according to claim 1, wherein each of the fibers comprises a diameter ranging from about 0.00001 inches to about 0.0300 inches.

4. A fiber article according to claim 1, wherein each of the fibers comprises a length ranging from about 0.10 inches to about 1.5 inches.

5. A fiber article according to claim 1, further comprising a binder material distributed among the directionally aligned and randomly dispersed fibers.

6. A fiber article according to claim 5, wherein the fiber article comprises about o binder material by weight.

7. A fiber article according to claim 5, wherein the binder material comprises an organic compound.

8. A fiber article according to claim 7, wherein the organic compound is selected from the group consisting of acrylic latex, urea-formaldehyde, SBR latex, acrylic emulsions, and mixtures thereof.

9. A fiber article according to claim 1, wherein the directionally aligned fibers constitute about 50% of the total thickness of the fiber article.

10. A fiber article according to claim 1, wherein the fiber article has a tear-strength under the Elmendorf Tear Test of about 393 g mean tears when the fiber article has a weight of 1.6 lb/sq. and when 15% of the weight of the fiber article is binder material.

11. A fiber article according to claim 10, wherein an overall thickness of the fiber article is about 0.035 inches, and the directionally aligned fibers comprise a thickness in the article of about 0.002 to 0.010 inches.

12. A nonwoven fiber article, comprising:
a first surface comprising a pattern formed of chopped nonwoven fibers collectively aligned horizontally dispeised in at least three predetermined directions on the same linear plane, and thus the collections in the predetermined directions having substantially the same thickness as the thickness of the linear plane, the fibers dewatered from a slurry such that fibers collectively dispersed in one of the predetermined directions are laid randomly interlaced with fibers collectively dispersed in others of the predetermined directions at intersections of the collections in the at least three predetermined directions; and
a second surface opposed to and coextensive with the first surface, the second surface comprising a collection of chopped nonwoven fibers dewatered from the slurry such that they are laid randomly dispersed throughout the second surface.

13. A fiber article according to claim 12, wherein the fibers are selected from the group consisting of: glass fibers, synthetic polymer fibers, ceramic and inorganic fibers, natural fibers, cellulosic fibers, and mixtures of any or all thereof.

14. A fiber article according to claim 12, wherein each of the fibers comprises a diameter ranging from about 0.00001 inches to about 0.0300 inches.

15. A fiber article according to claim 12, wherein each of the fibers comprises a length ranging from about 0.10 inches to about 1.5 inches.

16. A fiber article according to claim 12, and further comprising a binding material dispersed substantially throughout the fiber article for binding the fibers in their dispersed orientations.

17. A fiber article according to claim 16, wherein the binding material is an organic compound, and wherein the organic compound is selected from the group consisting of acrylic latex, urea-formaldehyde, SBR latex, acrylic emulsions, and mixtures thereof.

18. A fiber article according to claim 12, wherein the fibers comprising the first surface are horizontally dispersed in linear formations extending in the at least three predetermined directions.

19. A fiber article according to claim 12, wherein the fibers of the first surface that are horizontally dispersed in predetermined directions constitute about 50% of the total thickness of the fiber article.

20. A fiber article according to claim 12, wherein the fiber article has a tear-strength under the Elmendorf Tear Test of about 393 g mean tears when the fiber article has a weight of 1.6 lb/sq. and when 15% of the weight of the fiber article is binder material.

21. A fiber article according to claim 20, wherein an overall thickness of the fiber article is about 0.035 inches, and the fibers of the first surface that are horizontally dispersed in predetermined directions comprise a thickness in the article of about 0.002 to 0.010 inches.

22. A fiber article according to claim 12, wherein the fibers of the first surface and the fibers of the second surface are collectively, horizontally dispersed to a substantially uniform thickness.

23. A fiber article according to claim 12, wherein the binding material comprises about 5% to 30% of a total weight of the fiber article.

* * * * *

UNITED STATES PATENT AND TRADEMARK OFFICE
CERTIFICATE OF CORRECTION

| | |
|---|---|
| PATENT NO. | : 7,309,668 B2 |
| APPLICATION NO. | : 10/726461 |
| DATED | : December 18, 2007 |
| INVENTOR(S) | : Wilson et al. |

Page 1 of 1

It is certified that error appears in the above-identified patent and that said Letters Patent is hereby corrected as shown below:

Column 10, Line 49, Claim 6, delete "o" and insert in lieu thereof -- 5-30% --
Column 10, Line 61, Claim 10, delete "393 g" and insert in lieu thereof -- 393g --

Column 11, Line 3, Claim 12, delete "dispeised"

Column 12, Line 16, Claim 20, delete "393 g" and insert in lieu thereof -- 393g --

Signed and Sealed this

Seventeenth Day of June, 2008

JON W. DUDAS
*Director of the United States Patent and Trademark Office*